Patented Nov. 29, 1938

2,138,583

UNITED STATES PATENT OFFICE 2,138,583

PROCESS AND CATALYST FOR MAKING OLEFINE OXIDES

Herbert Langwell, Windmill End, Epsom, Charles Bernard Maddocks, Epsom, and John Francis Short, Cheam, England, assignors to Carbide and Carbon Chemicals Corporation, a corporation of New York No Drawing. Application November 21, 1936, Serial No. 112,080. In Great Britain November 22, 1935

4 Claims. (Cl. 23—234)

The present invention relates to the production of olefine oxides from olefines by direct oxidation with oxygen or oxygen-containing gases. It has already been proposed to use catalysts consisting of silver or gold, either alone or alloyed with small amounts of another metal, as catalysts for the production of olefine oxides by the direct oxidation of olefines at temperatures in the neighborhood of 200° to 400° C. In endeavoring to carry out manufacture on an industrial scale by the use of such catalysts, certain difficulties have been encountered, and various expedients have been proposed for producing extremely active catalysts. Moreover, the high temperatures required have led to difficulty in obtaining satisfactory results.

It is an object of this invention to provide improved catalysts for the purpose set forth, which are very durable and active, and which largely mitigate the disadvantages mentioned.

According to the present invention, olefine oxides are obtainable by the direct oxidation of olefines by means of a catalyst consisting of or comprising essentially silver or gold, or both, that has been given a preliminary heating, and has then been reduced to a finely divided state. The heating appears to have the effect of removing catalyst poisons from the metal. The silver and gold can, if desired, be mixed or alloyed with each other, or with small quantities of other metals.

A particularly advantageous way of obtaining the metal or alloy in the desired condition to serve as an active and durable catalyst is to reduce it mechanically to a finely divided state by comminuting thin leaves of the metal or alloy, and then to heat it just sufficiently to form a weakly coherent mass, after which it is again reduced to comminuted form. Silver and gold in this form are highly active and durable catalysts.

The following is an example of satisfactory procedure in preparing the catalyst:—

Silver leaf is fed dry into a high speed impact type mill or disintegrator to give a powder fine enough to pass through a sieve of, say, 100 meshes per linear inch. The powder is then annealed at a temperture of about 400° to 450° C. for about two hours to effect partial sintering of the powder. The product obtained by this heating is then again passed through the impact mill, or, alternatively, it is disintegrated by rubbing it through a sieve to reduce it again to the state of powder. This powder forms the active catalytic mass and may be used in that condition. Also, it may advantageously be mixed with water, or with viscous solutions, such as those of cellulose acetate, and applied as a paste to the surface of the reaction chamber or tube, which is then heated to burn off the cellulose acetate or equivalent material, leaving the metal in place. The annealing step eliminates catalyst poisons, and confers a high degree of activity which permits the optimum temperature of oxidation of the olefines to be appreciably reduced.

We claim:

1. Catalyst for the production of olefine oxides by the oxidation of olefines with oxygen-containing gas, which catalyst is composed of finely divided metal of the group consisting of silver, gold, and alloys predominating in at least one of these, said metal having been mechanically reduced from thin leaves to a finely divided state capable of passing through a sieve of about 100 meshes per linear inch, and thereafter activated by heating at a temperature of 400° to 450° C. for two hours, the temperature and time of heating being so correlated as to cause a partial sintering of said finely divided metal just sufficient to form a weakly coherent mass.

2. Catalyst for the production of ethylene oxide by the direct oxidation of ethylene at temperatures of about 200° to about 400° C. with oxygen-containing gas, which catalyst is composed of finely divided silver metal which has been mechanically reduced from thin leaves to a finely divided state capable of passing through a sieve of about 100 meshes per linear inch, and thereafter activated by heating it at a temperature of 400° to 450° C. for about two hours, the temperature and time of heating being so correlated as to cause partial sintering of said finely divided metal just sufficient to form a weakly coherent mass.

3. Process for making catalysts composed of finely divided metal of the group consisting of silver, gold, and alloys predominating in at least one of these for the production of olefine oxides by the oxidation of olefines with an oxygen-containing gas, which includes the steps of mechanically reducing said metal to a finely divided state capable of passing through a sieve of about 100 meshes per linear inch, thereafter activating said metal by heating it to a temperature of 400° to 450° C. for about two hours, the temperature and time of of heating being so correlated as to cause a partial sintering of said finely divided metal just sufficient to form a weakly coherent mass, and again mechanically reducing said metal to a finely divided state.

4. Process for making catalysts of finely divided silver for the production of ethylene oxide by oxidation of ethylene with oxygen-containing gas at temperatures of about 200° to about 400° C., which includes the steps of mechanically reducing thin leaves of said metal to a finely divided state capable of passing through a sieve of about 100 meshes per linear inch, thereafter activating said metal by heating it to a temperature of 400° to 450° C. for about two hours, the temperature and time of heating being so correlated as to cause a partial sintering just sufficient to form a weakly coherent mass, and again mechanically reducing said metal to a finely divided state.

HERBERT LANGWELL.
CHARLES BERNARD MADDOCKS.
JOHN FRANCIS SHORT.